Patented May 25, 1954

UNITED STATES PATENT OFFICE 2,679,516

ESTERS OF OXYPROPYLATED POLYPENTAERYTHRITOLS

Melvin De Groote, University City, Mo., assignor to Petrolite Corporation, a corporation of Delaware No Drawing. Application May 14, 1951,
Serial No. 226,315

8 Claims. (Cl. 260—475)

The present invention is a continuation-in-part of my copending applications, Serial Nos. 127,773, now U. S. Patent No. 2,552,533, and 127,774, now abandoned, both filed November 16, 1949. Said aforementioned co-pending applications represent in turn a continuation-in-part of my co-pending applications, Serial Nos. 104,801, now U. S. Patent No. 2,552,528, and 104,802, now abandoned, both filed July 14, 1949. See also my co-pending applications, Serial Nos. 104,805, now U. S. Patent No. 2,554,667, and 104,806, now abandoned, both filed July 14, 1949.

The present invention is concerned with certain new chemical products, compounds, or compositions which have useful application in various arts. It includes methods or procedures for manufacturing said new chemical products, compounds, or compositions, as well as the products, compounds, or compositions themselves.

Complementary to the above aspect of the invention herein disclosed is my companion invention concerned with the use of these particular chemical compounds, or products, as demusifying agents in processes or procedures particularly adapted for preventing, breaking, or resolving emulsions of the water-in-oil type, and particularly petroleum emulsions. See my co-pending application, Serial No. 226,314, filed May 14, 1951, now U. S. Patent No. 2,626,907.

Co-pending application Serial No. 104,801, now U. S. Patent No. 2,552,528, may be characterized by claim 1 of said application, which is as follows:

"A process for breaking petroleum emulsions of the water-in-oil type characterized by subjecting the emulsion to the action of a demulsifier including high molal oxypropylation derivative of monomeric polyhydric compounds with the proviso that (a) the initial polyhydric reactant be free from any radical having at least 8 uninterrupted carbon atoms; (b) the initial polyhydric reactant have a molecular weight not over 1,200 and at least 4 hydroxyl radicals; (c) the initial polyhydric reactant be water-soluble and xylene-insoluble; (d) the oxypropylation end product be water-insoluble and xylene-soluble; (e) the oxypropylation end product be within the molecular weight range of 2,000 to 30,000 on an average statistical basis; (f) the solubility characteristics of the oxypropylation end product in respect to water and xylene be substantially the result of the oxypropylation step; (g) the ratio of propylene oxide per hydroxyl in the initial polyhydric reactant be within the range of 7 to 70; (h) the initial polyhydric reactant represent not more than 12½% by weight of the oxypropylation end product on a statistical basis, and (i) the preceding provisos being based on complete reaction involving the propylene oxide and the initial polyhydric reactant."

Claim 1 of Serial No. 104,802, filed July 14, 1939, now abandoned, is substantially the same, except that it is concerned with the high molal oxypropylation derivatives as such and not specifically for demulsification.

Attention is additionally directed to the co-pending application of Melvin De Groote, Serial No. 127,771, now U. S. Patent No. 2,552,532 filed November 16, 1949. Briefly stated, the particular invention described in this co-pending application is concerned with the breaking of petroleum emulsions of the water-in-oil type characterized by subjecting the emulsion to the action of a demulsifier including high molal oxypropylation derivatives of oxyalkylated intermediates; said oxyalkylated intermediates being derived in turn from water-insoluble xylene-insoluble, polypentaerythritols having at least 8 hydroxyl radicals, with the proviso that (a) the initial polyhydric reactant be free from any radical having at least 8 uninterrupted carbon atoms; (b) the intermediate have a molecular weight in excess of 1,200 and less than 25,000; (c) the intermediate product be obtained by an oxypropylation step involving a member of the class consisting of ethylene oxide and glycide; (d) the intermediate product be water-dispersible, at least to the extent of colloidal solubility, and be xylene-insoluble; (e) the solubility characteristics of the intermediate in respect to water be substantially the result of the oxyalkylation step employing a member of the class consisting of ethylene oxide and glycide; (f) the oxypropylation end product be within the molecular weight range of 5,000 to 100,000 on an average statistical basis; (g) the oxypropylation end product be xylene-soluble; (h) the xylene solubility characteristics of the oxypropylation end product be substantially the result of the oxypropylation step; (i) the initial polyhydric reactant represent not more than 7% by weight of the oxypropylation end product on a statistical basis, and that (j) the preceding provisos be based on complete reaction involving the alkylene oxides and the initial polyhydric reactant.

My co-pending application, Serial No. 127,772, now abandoned, also filed November 16, 1949, is substantially the same except that it is concerned with the high molal oxypropylation derivatives as such and not specifically for demulsification.

The invention of Serial No. 127,773, filed November 16, 1949, now U. S. Patent No. 2,552,533, is differentiated from the two previously described inventions in that the initial reactant is not water-soluble, thus being distinguished from the inventions in my co-pending applications, Serial Nos. 104,801, now U. S. Patent No. 2,552,528, and 104,802, now abandoned, both filed July 14, 1949; and distinguished from the invention described in my co-pending application, Serial No. 127,771, filed November 16, 1949, now U. S. Patent No. 2,552,532, insofar that the initially water-insoluble material is not subjected to an intermediate step such as treatment with ethylene oxide or glycide, or both, to render it at least colloidally water-soluble. Stated another way, in the said invention the initially water-insoluble and xylene-insoluble material is treated at once with propylene oxide so as to render it xylene-soluble.

The final oxypropylation products as described in co-pending application Serial No. 127,773, now U. S. Patent No. 2,552,533, are not only xylene-soluble but may be even water-dispersible, especially in the latter stages of oxypropylation. In the higher stages they are invariably water-insoluble and this applies particularly to the oxysoluble and this applies particularly to the oxypropylation derivatives derived from polypentaerythritol of a molecular weight greater than that of hepta-pentaerythritol.

More specifically, then, the process of Serial No. 127,773 is concerned with treating petroleum emulsions of the water-in-oil type with the oxypropylation products obtained from tripentaerythritol and higher polypentaerythritols.

Similarly, co-pending application, Serial No. 127,774, now abandoned, is concerned with the compounds as such and is not specifically limited to the use as demulsifiers.

Referring to the two previously mentioned co-pending applications, to wit, Serial Nos. 127,773, now U. S. Patent No. 2,552,533, and 127,774, now abandoned, both filed November 16, 1949, there appeared subject matter concerned with derivatives of such oxypropylated polyhydric compounds and which stated that such oxypropylated polyhydric compounds can be combined with a wide variety of polycarboxy acids, such as tricarballylic acid, or citric acid, but it is preferred to employ a dicarboxy acid, or acid anhydride, such as oxalic acid, maleic acid, tartaric acid, citraconic acid, phthalic acid, adipic acid, succinic acid, azelaic acid, sebacic acid, adduct acids obtained by reaction between maleic anhydride, citraconic anhydride, and butadiene, diglycollic acid or a cyclopentadiene adduct. A specific type described includes acidic fractional esters, i. e., esters having free carboxyl radicals.

Furthermore, as stated in said previously referred to subject matter, the new derivatives include among others acid esters of the kind just referred to and having the properties of the original hydroxylated compound insofar that they are effective and valuable demulsifying agents for resolution of water-in-oil emulsions as found in the petroleum industry, as break inducers in doctor treatment of sour crude, etc.

Dipentaerythritol is only slightly water-soluble at ordinary temperatures, possibly in the neighborhood of about two-tenths per cent. It is not unusual to classify such materials for ordinary purposes as being sparingly soluble or insoluble for the particular purpose in mind. In other words, dipentaerythritol is in essence a borderline compound that can be classified either way, depending on the purpose in mind. For this reason I have preferred to consider dipentaerythritol as "water-insoluble" in the present description and thus include it with tripentaerythritol and higher pentaerythritols. Such change involves essentially only one change in the description of the invention of Serial No. 127,773, now U. S. Patent No. 2,552,533, to wit, including polypentaerythritols that have at least 6 hydroxyl radicals. In essence, the only other change required is to take out the word "water-insoluble" for the reason that tripentaerythritol and higher pentaerythritols are water-insoluble and the status of dipentaerythritol, as previously pointed out, has already been noted. Otherwise, some awkward nomenclature, such as "polypentaerythritols which at the most are only sparingly water-soluble" would have to be included and would add nothing to point out the invention with greater specificity. This simply means that what is said herein is also a continuation-in-part of aforementioned co-pending applications, Serial Nos. 104,805, now U. S. Patent No. 2,554,667, and 104,806, now abandoned, both filed on July 14, 1949. These last two co-pending applications in essence were concerned with dipentaerythritols previously described.

In fact, there does not seem to be anything gained by including reference to having at least 6 hydroxyls for the reason that all polypentaerythritols beginning with dipentaerythritol upward have at least 6 hydroxyls. Furthermore, they are all xylene-insoluble. With this in mind, it will be noted that the statement of the invention subsequently has been simplified. As has been pointed out previously, due to commerical availability and for other reasons, my preferred polypentaerythritols are dipentaerythritols and tripentaerythritols.

The present invention is concerned with these last-mentioned previously-described acidic esters (co-pending Serial Nos. 104,805, now U. S. Patent No. 2,554,667, and 104,806 now abandoned, both filed July 14, 1949; and Serial Nos. 127,773, now U. S. Patent No. 2,552,533, and 127,774, now abandoned, both filed November 16, 1949) as new chemical compounds and which are of particular value as demulsifiers for water-in-oil emulsions. More specifically, then, the present invention is concerned with certain acidic fractional esters; said acidic fractional esters being obtained by reaction between (A) a polycarboxy acid and (B) high molal oxypropylation derivatives of polypentaerythritols, with the proviso that (a) the initial polyhydric reactant be free from any radical having at least 8 uninterrupted carbon atoms; (b) the oxypropylation end product be within the molecular weight range of 5,000 to 65,000 on an average statistical basis; (c) the oxypropylation end product by xylene-soluble; (d) the xylene solubility characteristics of the oxypropylation end product be substantially the result of the oxypropylation step; (e) the initial polyhydric reactant represent not more than 7% by weight of the oxypropylation end product on a statistical basis; and that (f) the preceding provisos be based on complete reaction involving the propylene oxide and the initial polyhydric reactant; with the proviso that the ratio of (A) to (B) be one mole of the polycarboxy acid for each available hydroxyl radical.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in my co-pending application, Serial No. 226,314, filed May 14, 1951, now U. S. Patent No. 2,626,907.

The new products are useful as wetting, detergent and leveling agents in the laundry, textile and dyeing industries; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes, as lubricants, etc.

For convenience, what is said hereinafter is divided into four parts:

Part 1 is concerned with the description of the polyhydric reactants employed, as well as reference to other compounds, products, etc., so there may be a clear line of demarcation between the present invention and what may appear elsewhere;

Part 2 is concerned with the preparation of the oxypropylated derivatives;

Part 3 is concerned with the preparation of the acidic esters by reacting the polyhydroxylated compounds with polycarboxy acids; and Part 4 is concerned with the use of certain valuable derivatives which can be obtained readily from the herein described fractional esters.

PART 1

Generally speaking, organic compounds having approximately the same number of oxygen atoms as carbon atoms are apt to be, and almost invariably are, water-soluble, and the most common could be illustrated by ethyl alcohol, methyl alcohol, acetic acid, acetone, formaldehyde, etc. When compounds reach enormously high molecular weights compared with such simple compounds, for instance, in the category of 30,000 to 50,000, or upward and preferably upward, such approximate ratio of carbon to oxygen does not necessarily guarantee water-solubility as, for example, in the case of cellulose or possibly some starches. There are other classes of comparatively low molecular weight compounds, for instance, polypentaerythritols, varying from tri-pentaerythritol to deca-pentaerythritol, where the molecular weight varies roughly from 372 to 1,200, which are not water-soluble in the ordinary sense. Pentaerythritol is fairly water-soluble, approximately 4% or 5% in water at ordinary temperature. Di-pentaerythritol is soluble to the extent of two-tenths of one per cent and is an initial material employed in the process or composition described in my aforementioned co-pending applications, Serial Nos. 104,801, now U. S. Patent No. 2,552,528, and 104,802, now abandoned, both filed July 14, 1949. The higher pentaerythritols do not qualify as a raw material in the aforementioned co-pending applications for the reason they do not meet the specification as to water-solubility prior to oxypropylation.

The present invention, as has been pointed out previously, is concerned with acidic fractional esters which, in turn, are obtained from the oxypropylation products derived from dipentaerythritol and higher polypentaerythritols. Such oxypropylation is conducted to the stage where the end products are xylene-soluble and have a molecular weight within the range of 5,000 to 65,000. Such polyhydric compounds after oxypropylation are subjected to reaction with polycarboxy acids so as to yield acid esters. The acid esters so obtained are valuable for numerous purposes and particularly for resolution of water-in-oil emulsions. The oxypropylation derivatives prior to esterification may be considered conveniently as intermediates.

The acidic fractional esters owe their valuable properties, at least in part, to the inherent properties of the parent hydroxy compound or the derivatives which have been previously referred to as intermediates. These intermediate compounds herein described owe their peculiar properties to a number of factors immediately enumerated, at least in part:

(a) Size of molecule
(b) Shape of molecule as far as space configuration goes
(c) Absence of a single hydrophobe group having as many as 8 uninterrupted carbon atoms in a single radical
(d) Substantial insolubility in water in certain instances
(e) Solubility in xylene
(f) The fact that the initial reactant requires the presence of at least 6 hydroxyl radicals
(g) Such combination being obtained by reaction involving propylene oxide.

My preferred initial reactants are the polypentaerythritols as herein described. For purpose of convenience the word "polypentaerythritol" will mean those higher derivatives beginning with dipentaerythritol, up to and including the deca-pentaerythritols, or other comparable members of the class. In this connection in regard to the preparation of polypentaerythritols attention is directed to U. S. Patent No. 2,462,049, dated February 15, 1949, to Wyler. For instance, this patent mentions, among other things, the following:

| | Molecular weight |
|---|---|
| Tri-pentaerythritol | 372.41 |
| Tetra-pentaerythritol | 490.54 |
| Penta-pentaerythritol | 608.67 |
| Hexa-pentaerythritol | 726.80 |
| Hepta-pentaerythritol | 844.93 |
| Octa-pentaerythritol | 963.06 |
| Nona-pentaerythritol | 1,081.19 |
| Deca-pentaerythritol | 1,199.32 |

Other procedures have been described for preparing polypentaerythritol, using some other catalyst as described in British Patent No. 615,370, to Marrian and McLean (Imperial Chemical Industries, Ltd.)

The same catalyst as used in the above two mentioned issued patents illustrates a class of catalyst employed also to produce etherization in numerous other polyhydric compounds as, for example, in the case of polyglycerols, sorbitol, etc., etc. It is obvious that modified polypentaerythritol can be obtained by inter-mixing with another polyhydric alcohol, even though not water-insoluble, followed by etherization, to produce the higher molecular weight product. For instance, two moles of tripentaerythritol could be polymerized with one mole of glycol or diglycerol to give a modified hexa-pentaerythritol which, in essence, might be somewhat analogous to a hexa-pentaerythritol treated with glycide, although not necessarily so. Similarly, other polyhydric alcohols, such as sorbitol, sorbitan, mannitan, manitol, and tetramethylolhexanol, can be employed, provided, however, that the resultant used as an initial reactant is water-insoluble, and xylene-insoluble, has at least 6 hydroxyls and a molecular weight not in excess of 1200. Such materials can be varied in an inconsequential or insignificant sort of way without detracting from the structure of the final oxypropylated derivative; for instance, a number of the hydroxyl groups might be converted into an acetal or a ketal in the conventional manner; or one might produce an ester of a low molal acid, such as acetic acid, glycollic acid, lactic acid, propionic acid, etc. Tripentaerythritol could be treated with a mole of ethylene oxide or several moles of ethylene oxide, or a mole of glycide, or a mole of butylene oxide, or methyl glycide, and then subjected to polymerization so as to give materials which, obviously, are the chemical and also physical-chemical equivalent of the herein specified, preferred and commercially available reactants, i. e., the polypentaerythritols.

My preferred reactants are tripentaerythritol, which is sold commercially, and a higher polypentaerythritol (average hydroxyl content 32.3). My third preferred reactant is the tetrapentaerythritol manufactured in the manner described in Example 2 of aforementioned British Patent No. 615,370.

In a preceding paragraph reference has been made to substantial insolubility in water in certain cases. In examining the data in Part Two of the text it will be noted that the derivatives are limited to those which show xylene-solubility and that in the higher stages of oxypropylation the derivatives show water-insolubility or substantial water-insolubility. This is illustrated by examples and, as a matter of fact, in many instances the water-insoluble derivatives are particularly to be preferred for use as demulsifiers.

PART 2

For a number of well known reasons equipment, whether laboratory size, semi-pilot plant size, pilot plant size, or large scale size, is not as a rule designed for a particular alkylene oxide. Invariably and inevitably, however, or particularly in the case of laboratory equipment and pilot plant size the design is such as to use any of the customarily available alkylene oxides, i. e., ethylene oxide, propylene oxide, butylene oxide, glycide, epichlorohydrin, styrene oxide, etc. In the subsequent description of the equipment it becomes obvious that it is adapted for oxyethylation as well as oxypropylation.

Oxypropylations are conducted under a wide variety of conditions, not only in regard to presence or absence of catalyst, and the kind of catalyst, but also in regard to the time of reaction, temperature of reaction, speed of reaction, pressure during reaction, etc. For instance, oxyalkylations can be conducted at temperatures up to approximately 200° C. with pressures in about the same range up to about 200 pounds per square inch. They can be conducted also at temperatures approximating the boiling point of water or slightly above, as for example 95° to 120° C. Under such circumstances the pressure will be less than 30 pounds per square inch unless some special procedure is employed as is sometimes the case, to wit, keeping an atmosphere of inert gas such as nitrogen in the vessel during the reaction. Such low-temperature—low reaction rate oxypropylations have been described very completely in U. S. Patent No. 2,448,664, to H. R. Fife, et al., dated September 7, 1948. Low temperature, low pressure oxypropylations are particularly desirable where the compound being subjected to oxypropylation contains one, two or three points of reaction only, such as monohydric alcohols, glycols and triols.

Since low pressure—low temperature reaction speed oxypropylations require considerable time, for instance, 1 to 7 days of 24 hours each to complete the reaction they are conducted as a rule whether on a laboratory scale, pilot plant scale, or large scale, so as to operate automatically. The prior figure of seven days applies especially to large-scale operations. I have used conventional equipment with two added automatic features; (a) a solenoid controlled valve which shuts off the propylene oxide in event that the temperature gets outside a predetermined and set range, for instance, 95° to 120° C., and (b) another solenoid valve which shuts off the propylene oxide (or for that matter ethylene oxide if it is being used) if the pressure gets beyond a predetermined range, such as 25 to 35 pounds. Otherwise, the equipment is substantially the same as is commonly employed for this purpose where the pressure of reaction is higher, speed of reaction is higher, and time of reaction is much shorter. In such instances such automatic controls are not necessarily used.

Thus, in preparing the various examples I have found it particularly advantageous to use laboratory equipment or pilot plant equipment which is designed to permit continuous oxyalkylation whether it be oxypropylation or oxyethylation. With certain obvious changes the equipment can be used also to permit oxyalkylation involving the use of glycide where no pressure is involved except the vapor pressure of a solvent, if any, which may have been used as a diluent.

As previously pointed out the method of using propylene oxide is the same as ethylene oxide. This point is emphasized only for the reason that the apparatus is so designed and constructed as to use either oxide.

The oxypropylation procedure employed in the preparation of the oxyalkylated derivatives has been uniformly the same, particularly in light of the fact that a continuous automatically-controlled procedure was employed. In this procedure the autoclave was a conventional autoclave made of stainless steel and having a capacity of approximately 15 gallons and a working pressure of one thousand pounds gauge pressure. This pressure obviously is far beyond any requirement as far as propylene oxide goes unless there is a reaction of explosive violence involved due to accident. The autoclave was equipped with the conventional devices and openings, such as the variable-speed stirrer operating at speeds from 50 R. P. M. to 500 R. P. M.; thermometer well and thermocouple for mechanical thermometer; emptying outlet, pressure gauge, manual vent line; charge hole for initial reactants; at least one connection for introducing the alkylene oxide, such as propylene oxide or ethylene oxide, to the bottom of the autoclave; along with suitable devices for both cooling and heating the autoclave, such as a cooling jacket, and, preferably, coils in addition thereto, with the jacket so arranged that it is suitable for heating with steam or cooling with water and further equipped with electrical heating devices. Such autoclaves are, of course, in essence small-scale replicas of the usual conventional autoclave used in oxyalkylation procedures. In some instances in exploratory preparations in autoclave having a smaller capacity, for instance, approximately 3½ liters in one case and about 1¾ gallons in another case, was used.

Continuous operation, or substantially continuous operation, was achieved by the use of a separate container to hold the alkylene oxide being employed, particularly propylene oxide. In conjunction with the smaller autoclaves, the container consists essentially of a laboratory bomb having a capacity of about one-half gallon, or somewhat in excess thereof. In some instances a larger bomb was used, to wit, one having a capacity of about one gallon. This bomb was equipped, also, with an inlet for charging, and an eductor tube going to the bottom of the container so as to permit discharging of alkylene oxide in the liquid phase to the autoclave. A bomb having a capacity of about 60 pounds was used in connection with the 15-gallon autoclave. Other conventional equipment consists, of course, of the rupture disc, pressure gauge, sight feed glass, thermometer connection for nitrogen for pressuring bomb, etc. The bomb was placed on a scale during use. The connections between the bomb and the autoclave were flexible stainless steel hose or tubing so that continuous weighings could be made without breaking or making any connections. This applies also to the nitrogen line, which was used to pressure the bomb reservoir. To the extent that it was required, any other usual conventional procedure or addition which provided greater safety was used, of course, such as safety glass protective screens, etc.

Attention is directed again to what has been said previously in regard to automatic controls which shut off the propylene oxide in event temperature of reaction passes out of the predetermined range or if pressure in the autoclave passes out of predetermined range.

With this particular arrangement practically all oxypropylations become uniform in that the reaction temperature was held within a few degrees of any selected point, for instance, if 105° C. was selected as the operating temperature the maximum point would be at the most 110° C. or 112° C., and the lower point would be 95° or possibly 98° C. Similarly, the pressure was held at approximately 30 pounds within a 5-pound variation one way or the other, but might drop to practically zero, especially where no solvent such as xylene is employed. The speed of reaction was comparatively slow under such conditions as compared with oxyalkylations at 200° C. Numerous reactions were conducted in which the time varied from one day (24 hours) up to three days (72 hours), for completion of the final member of a series. In some instances the reaction may take place in considerably less time, i. e., 24 hours or less, as far as a partial oxypropylation is concerned. The minimum time recorded was about a 3-hour period in a single step. Reactions indicated as being complete in 10 hours may have been complete in a lesser period of time in light of the automatic equipment employed. This applies also where the reactions were complete in a shorter period of time, for instance, 4 to 5 hours. In the addition of propylene oxide, in the autoclave equipment as far as possible the valves were set so all the propylene oxide if fed continuously would be added at a rate so that the predetermined amount would react within the first 15 hours of the 24-hour period or two-thirds of any shorter period. This meant that if the reaction was interrupted automatically for a period of time for pressure to drop or temperature to drop the predetermined amount of oxide would still be added in most instances well within the predetermined time period. Sometimes where the addition was a comparatively small amount in a 10-hour period there would be an unquestionable speeding up of the reaction, by simply repeating the examples and using 3, 4 or 5 hours instead of 10 hours.

When operating at a comparatively high temperature, for instance, between 150° to 200° C., an unreacted alkylene oxide such as propylene oxide, makes its presence felt in the increase in pressure or the consistency of a higher pressure. However, at a low enough temperature it may happen that the propylene oxide goes in as a liquid. If so, and if it remains unreacted there is, of course, an inherent danger and appropriate steps must be taken to safeguard against this possibility; if need be a sample must be withdrawn and examined for unreacted propylene oxide. One obvious procedure, of course, is to oxypropylate at a modestly higher temperature, for instance, at 140° to 150° C. Unreacted oxide affects determination of the acetyl or hydroxyl value of the hydroxylated compound obtained.

The higher the molecular weight of the compound, i. e., towards the latter stages of reaction, the longer the time required to add a given amount of oxide. One possible explanation is that the molecule, being larger, the opportunity for random reaction is decreased. Inversely, the lower the molecular weight the faster the reaction takes place. For this reason, sometimes at least, increasing the concentration of the catalyst does not appreciably speed up the reaction, particularly when the product subjected to oxyalkylation has a comparatively high molecular weight. However, as has been pointed out previously, operating at a low pressure and a low temperature even in large scale operations as much as a week or ten days time may lapse to obtain some of the higher molecular weight derivatives from monohydric or dihydric materials.

In a number of operations the counterbalance scale or dial scale holding the propylene oxide bomb was so set that when the predetermined amount of propylene oxide had passed into the reaction the scale movement through a time operating device was set for either one to two hours so that reaction continued for 1 to 3 hours after the final addition of the last propylene oxide and thereafter the operation was shut down. This particular device is particularly suitable for use on larger equipment than laboratory size autoclaves, to wit, on semi-pilot plant or pilot plant size, as well as on large scale size. This final stirring period is intended to avoid the presence of unreacted oxide.

In this sort of operation, of course, the temperature range was controlled automatically by either use of cooling water, steam, or electrical heat, so as to raise or lower the temperature. The pressuring of the propylene oxide into the reaction vessel was also automatic insofar that the feed stream was set for a slow continuous run which was shut off in case the pressure passed a predetermined point as previously set out. All the points of design, construction, etc., were conventional including the gauges, check valves and entire equipment. As far as I am aware at least two firms, and possibly three, specialize in autoclave equipment such as I have employed in the laboratory, and are prepared to furnish equipment of this same kind. Similarly pilot plant equipment is available. This point is simply made as a precaution in the direction of safety. Oxyalkylations, particularly involving ethylene oxide, glycide, propylene oxide, etc., should not be conducted except in equipment specifically designed for the purpose.

What is said here immediately following is essentially the same data which appeared in my two previously-referred to co-pending applications, Serial Nos. 127,773, now U. S. Patent No. 2,552,533, and 127,774, now abandoned, both filed November 16, 1949. Although I have prepared acidic esters from the compounds described in this subject matter immediately following, yet the polypentaerythritols which are most readily available commercially and, in fact, available from more than one source, are dipentaerythritols and tripentaerythritols. It is my preference to have a very complete description of the acidic esters derived from these two latter compounds. Therefore, after this initial presentation identical with what was said in Serial Nos. 127,773, now U. S. Patent No. 2,552,533, and 127,774, now abandoned, I have included extensive data as to these lower monomeric derivatives of pentaerythritol. For purpose of clarity I am designating the older series by Examples 1, 2, 3 etc., and the new series as Examples 1a, 2a, 3a, etc.

quired was 3¼ hours. The maximum temperature was 185° C.

The product obtained still showed dispersibility in water and was not appreciably soluble in xylene. Part of the batch was allowed to stay in the autoclave. The exact amount was 790.5 grams. The amount of solvent present was 85 grams. No additional sodium methylate was added. In this second stage 895 grams of propylene oxide were added. The time required was 2 hours. The maximum temperature was 173° C., and the maximum pressure 100 pounds per square inch. At the end of the reaction time the ratio of propylene oxide to initial reactant was 120 to 1 as compared to 53 to 1 in the first stage. The product still showed some tendency to disperse in water but was xylene-soluble.

The further addition of propylene oxide was made in subsequent stages until the product was practically insoluble in water. The data are recorded in the following table. It is to be noted that additionally two other polypentaerythritols were treated with propylene oxide and data included in the table, also.

*Example 1*

The reaction vessel employed was a stainless

| Ex. No. | Derivative No. | Amt. Taken, Gms. (Solvent Free) | Solvent Present, Gms. (Xylene) | Sod. Methylate Added, Gms. | PrO Added, Gms. | Time (hrs.) | Temp., Max., °C. | Max. Pres., lbs. per sq. in. | Molar Ratio of PrO to Initial Reactant | Solubility in Water | Solubility in Xylene | Molecular Wt. |
|---|---|---|---|---|---|---|---|---|---|---|---|---|
| 1 | A* | 200 | 200 | 10 | 1,650 | 3¼ | 185 | 100 | 53:1 | Dispersible | No | 3,450 |
| 2 |  | 790.5 | 85 |  | 895 | 2 | 173 | 100 | 120:1 | Tendency to disprs. | Yes | 7,432 |
| 3 |  | 743 | 9 |  | 700 | 3¼ | 186 | 135 | 240:1 | Less disprs. | Yes | 14,290 |
| 4 | 2 | 725 | 4 | 3 | 350 | 2¾ | 190 | 132 | 360:1 | Almost insol. | Yes | 21,000 |
| 5 | 3 | 245 | 200 | 12.5 | 3,063 | 2 | 170 | 90 | 179:1 | Disprs. | Yes | 11,285 |
| 6 | B* | 613.2 | 37.8 |  | 307 | 1 | 165 | 90 | 279:1 | Almost disprs. | Yes | 17,085 |
| 7 | 5 | 688.1 | 27.9 | 2 | 102 | ¼ | 170 | 180 | 328:1 | Insol. | Yes | 20,195 |
| 8 | 6 | 547.8 | 19.2 |  | 160 | ¼ | 165 | 100 | 418:1 | do | Yes | 27,200 |
| 9 | 7 | 545 | 15 |  | 58 | ½ | 180 | 110 | 468:1 | do | No | 31,100 |
| 10 | 8 | 490 | 300 | 2 | 1,750 | 2¾ | 192 | 130 | 30:1 | Disprs. | No | 2,240 |
| 11 | C* | 553 | 75 | 12 | 580 | 3¼ | 188 | 104 | 70:1 | Almost disprs. | Yes | 4,450 |
| 12 | 10 | 567 | 37 |  | 580 | 2½ | 165 | 102 | 150:1 | Almost insol. | Yes | 9,200 |
| 13 | 11 | 573 | 18 | 3 | 290 | 1¼ | 135 | 90 | 230:1 | Insol. | Yes | 13,340 |
| 14 | 12 | 431 | 9 |  | 290 | 2¼ | 145 | 108 | 310:1 | do | Yes | 18,510 |
| 15 | 13 | 721 | 9 |  | 290 | 1¾ | 125 | 125 | 390:1 | do | Yes | 23,100 |
| | 14 | | | | | | | | | | | |

A*—Tripentaerythritol.
B*—Heptapentaerythritol.
C*—Tetra-pentaerythritol.

steel autoclave with the usual devices for heating, heat control, stirrer, inlet, outlet, etc., which are conventional in this type of apparatus. Two different sizes were employed. In part of the experiments the capacity of the autoclave was 3½ liters, and in the other experiments a 5-liter capacity autoclave was employed. This was purely a matter of convenience. Otherwise the construction and operation of both autoclaves were the same. In both instances the stirrers operated at a speed of approximately 300 to 350 R. P. M. There were charged into the autoclave 200 grams of tripentaerythritol along with 200 grams of solvent (xylene). Any nonvolatile inert solvent, such as xylene, decalin, diethylether of ethylene glycol, or a higher boiling aromatic solvent, such as mesitylene, can be used. Approximately 10 grams of catalyst were added. Sodium methylate was used although ground caustic soda or ground caustic potash or any one of a number of other alkaline catalysts is equally suitable. The autoclave was sealed, swept with nitrogen gas, and stirring started immediately and heat applied, and the temperature allowed to rise to approximately 160° C. At this point addition of propylene oxide was started. It was added continuously at such speed that it was absorbed by the reaction as rapidly as added. During this first period approximately 1650 grams of propylene oxide were added. The time re- The products obtained above, of course, contain a solvent, to wit, xylene in this particular instance. The solvent can be removed in the conventional manner by vacuum distillation. In the case of xylene a temperature of 180° C. to 200° C. is perfectly satisfactory. The products obtained are usually viscous somewhat sirupy liquids of an amber, dark amber, or reddish color. The color may be due to a trace of iron because of contamination from the vessel employed. However, even when stainless steel is employed of such character that contamination by iron seems out of the question, there is still discoloration, probably due to the inherent nature of the initial raw material or a subsequent carmelization-like reaction.

The derivatives so obtained can be decolorized in the usual manner by treating with charcoal, filtering clay, or the like. If the solvent is to be removed and the product has to be decolorized, or else there may be some decolorization due to the heat used in solvent removal. However, for the bulk of purposes for which such materials are used there is no necessity for decolorizing and in many instances, as in the present instance, the solvent may remain in the material.

It will be noted that the molecular weight range of the acceptable final products is within the ratio of 5,000 to 65,000. Experimentation with polypentaerythritols higher than heptapentaerythritol has resulted in compounds which appear to be in the approximate weight range of 50,000 to 60,000. This figure cannot be set exactly for the reason that the exact composition of the higher polypentaerythritols is not exactly known. An attempt was made in this case to produce a deca-pentaerythritol and the composition may vary somewhat from the theoretical formula. For this reason, in the claims 65,000 was set as the upper limit.

It is obvious that certain modifications can be made which do not depart from the spirit of the invention. The initial raw materials, i. e., the specified polypentaerythritols or modifications thereof which bear a simple genetic relationship to polypentaerythritols, are water-insoluble materials. They are water-insoluble and xylene-insoluble. Such initial materials are treated in the manner described to yield materials which, as far as xylene-solubility goes, are xylene-soluble. Needless to say, the initial material could be treated with a mole or two, or thereabouts, of ethylene oxide of glycide, without bringing it within the range of my aforementioned co-pending application, Serial No. 127,771, filed November 16, 1949, now U. S. Patent No. 2,552,532.

Similarly, after oxypropylation starts one could interrupt the procedure and introduce a mole or two of ethylene oxide, or glycide, and then resume oxypropylation. Either one of such minor modifications would not significantly, nor perhaps even detectibly, change the character of the initial raw material or the final oxypropylation derivative. Needless to say, such variation would not be departing the slightest from the spirit of the invention.

If one examines the previous table it will be noted that starting with a raw material having a molecular weight of less than 1,000 one could obtain readily materials where the molecular weight is in excess of 30,000 or more. Stated another way, the initial raw material may contribute as little as 1% to the final product. The upper range is approximately 7%, i. e., the initial reaction contributes from a fraction of 1% up to 5%, 6% or 7% of the final product.

As pointed out previously the next series of intermediates will be described as Examples 1a through 13a, inclusive. These are the intermediates which are used in preparing the acidic esters described in Part 3 immediately following.

The equipment, procedure, etc., were the same as have been described previously. The temperature employed in this series was considerably lower than in the previous series, some compounds being prepared at modestly above the boiling point of water, about 240° to 250° F. Note that in the first series the temperature is recorded in degrees centigrade whereas in the instant series it is recorded in degrees Fahrenheit.

Example 1a

The starting material employed was commercial dipentaerythritol. The catalyst employed was caustic soda. The autoclave employed was one having a capacity of about 15 gallons or approximately 125 pounds. The equipment had all the control devices previously described. The speed of the stirrer could be varied from 150 to 350 R. P. M. 7.75 pounds of dipentaerythritol were charged into the autoclave. To this there were added 8.5 pounds of xylene and .75 pound of caustic soda. The reaction pot was flushed out with nitrogen. The autoclave was sealed and the automatic devices adjusted for injecting 43.5 pounds of propylene oxide in about a 5-hour period. The injection was at the rate of about 10 or 11 pounds per hour. This time-period was comparatively short due in part to the fact that there was present a considerable amount of catalyst. This particular oxypropylation was conducted at a temperature only slightly above the boiling point of water, to wit, 220° to 230° F. The pressure regulator was set for a maximum of 35–37 pounds per square inch. Since the propylene oxide reacted rather rapidly, at no time did the pressure rise beyond 34 pounds per square inch and it is probable that the bulk of the reaction took place at a lower pressure. The initial introduction of the propylene oxide was not started until the heating devices had raised the temperature to about the boiling point of water and, in fact, somewhat beyond.

As pointed out previously the reaction was complete in what was in reality a comparatively short period. At the end of this reaction part of the reaction mass was withdrawn as a sample and the remainder subjected to further oxypropylation as described in Example 2a immediately following.

Example 2a 52.63 pounds of the reaction mass equivalent to 6.75 pounds of dipentaerythritol, 37.85 pounds of propylene oxide, .65 pound of caustic soda and 7.38 pounds of solvent, and identified as Example 1a, preceding, were subjected to further oxypropylation under substantially the same conditions as described in Example 1a, particularly in regard to temperature and pressure. No additional catalyst was introduced. The reaction time was 4 hours. The amount of oxide introduced was 21.5 pounds. This was introduced at the rate of about 7 pounds per hour. At the completion of the reaction part of the mass was withdrawn as a sample and the remainder subjected to further oxypropylation as described in the next succeeding example.

Example 3a 50.63 pounds of the reaction mass previously identified as Example 2a, and equivalent to 4.62 pounds of dipentaerythritol, 40.51 pounds of propylene oxide, .45 pound of caustic soda, and .505 pound of solvent, were subjected to further oxypropylation in the manner described in the two preceding examples. In this instance, however, the temperature employed was very slightly higher than in Examples 1a and 2a, preceding. The temperature employed was 240° to 250° F. The pressure was lower, to wit, 20–25 pounds. It appeared that the higher temperature made the propylene oxide react a little faster than previously. No catalyst was added in this particular example nor in succeeding Examples 4a, 5a and 6a. For convenience, no further reference will be made to temperature or pressure in Examples 4a, 5a and 6a, for the reason that they are identical with the instant example.

The time required to add the oxide was 4 hours. The amount of oxide added was 21.25 pounds. The time required to add it was 4 hours. The rate of addition was about 6 or 7 pounds per hour. At the completion of the reaction part of the sample was withdrawn and the remainder subjected to further oxypropylation as noted in Example 4a, immediately following.

Example 4a 51.63 pounds of the reaction mass equivalent to 33.32 pounds of dipentaerythritol, 44.35 pounds of propylene oxide, .33 pound of caustic soda, and 3.63 pounds of solvent, were subjected to further oxypropylation as previously noted. 18.25 pounds of propylene oxide were added in a 5-hour period at a rate of about 4 to 5 pounds per hour. At the end of the reaction part of the sample was withdrawn and the remainder subjected to further oxypropylation as noted in Example 5a, following.

Example 5a 50.13 pounds of reaction mass previously identified as Example 4a and equivalent to 2.48 pounds of dipentaerythritol, 46.7 pounds of propylene oxide, and .24 pound of caustic soda and 2.71 pounds of solvent, were subjected to further oxypropylation in the manner previously described. The amount of propylene oxide added was 21 pounds. It was added in a 7-hour period at the rate of about 3½ pounds per hour. At the completion of the reaction part of the sample was withdrawn and the remainder subjected to a final oxypropylation as described in Example 6a, immediately following.

Example 6a 53.76 pounds of reaction mass previously identified as Example 5a, and equivalent to 1.82 pounds of dipentaerythritol, 49.77 pounds of propylene oxide, .18 pound of caustic soda, and 1.99 pounds of solvent, were subjected to oxypropylation with 12.5 pounds of propylene oxide. The time required was 7 hours and the rate was approximately 2 pounds per hour.

The series of examples, 7a through 13a, is comparable to previous series, Examples 1a through 6a, except that the initial material is tripentaerythritol instead of dipentaerythritol. The procedure is obviously comparable to that used in Examples 1a through 6a, and also conforms to what has been said previously.

Example 7a

The initial charge was 7.5 pounds of tripentaerythritol along with 17 pounds of xylene as a solvent, and .75 pound of caustic soda. The amount of propylene oxide added was 19.75 pounds. The addition was made at the rate of about 10 to 12 pounds per hour. A comparatively higher temperature was noted in this particular oxypropylation, to wit, 300° to 320° F. (not centigrade). The pressure devices were set for a maximum of 35–37 pounds per square inch. Subsequently both the temperature and pressure were lower. Since the initial reactant was not soluble in xylene there was some tendency for the reaction to be sluggish until it was at least partially soluble in xylene or completely solube in xylene. As soon as the reaction was complete part of the sample was withdrawn and subjected to further oxypropylation as described in Example 8a, immediately following.

Example 8a 37.88 pounds of reaction mass previously identified as Example 7a, and equivalent to 6.32 pounds of tripentaerythritol 16.63 pounds of propylene oxide, .63 pound of catalyst, and 14.3 pounds of xylene were subjected to further oxypropylation in the same manner as previously described. The amount of propylene oxide was 22.25 pounds. It was added in a 3-hour period at a rate of about 8 or 9 pounds per hour. No additional catalyst was added. This applies also to Examples 9a, through 13a, following.

In this example the maximum temperature was 250–270° F. This applies also to Examples 9a through 13a, following. The pressure controlling devices in this instance were set for 15–20 pounds. This applies also to Examples 9a through 13a, following.

At the completion of the reaction part of the mass was withdrawn and the remainder subjected to further oxypropylation as described in the next example.

Example 9a 48.11 pounds of reaction mass previously identified as Example 8a, and equivalent to 5.06 pounds of tripentaerythritol, 31.13 pounds of propylene oxide, .5 pound of caustic soda and 11.42 pounds of solvent, were subjected to further oxypropylation with 43.77 pounds of propylene oxide. This oxide was added in 6 hours at the rate of about 9 pounds per hour. At the end of the reaction part of the reaction mass was withdrawn and the remainder subjected to oxypropylation as described in Example 10a, following.

Example 10a 49 pounds of reaction mass identified as Example 9a, preceding, and equivalent to 2.7 pounds of tripentaerythritol, 39.93 pounds of propylene oxide, .27 pound of caustic soda, and 6.10 pounds of solvent, were subjected to further oxypropylation in the manner previously described. The amount of oxide added was 15.5 pounds of propylene oxide. The oxide was added in a 3-hour period at the rate of about 6 pounds per hour. At the end of the reaction part of the reaction mass was withdrawn and the remainder subjected to further oxypropylation as described in Example 11a, immediately following.

Example 11a 56.51 pounds of reaction mass identified as Example 10a preceding and equivalent to 2.36 pounds of tripentaerythritol, 48.56 pounds of propylene oxide, .23 pound of caustic soda, and 5.36 pounds of solvent, were subjected to further deoxypropylation in the manner previously described. The amount of oxide added was 10.5 pounds. It was added in a 3-hour period at the rate of about 5 pounds per hour. At the end of the reaction, part of the sample was withdrawn and the remainder subjected to further oxypropylation in the manner described in the next example.

Example 12a 59 pounds of the reaction mass identified as Example 11a, preceding, and equivalent to 2.08 pounds of tripentaerythritol, 52 pounds of propylene oxide, .2 pound of catalyst and 4.72 pounds of xylene were subjected to further oxypropylation. The amount of propylene oxide was 18 pounds and reaction time was 4 hours. The rate of oxide addition was about 5 pounds per hour. At the completion of the reaction part of the reaction mass was withdrawn and the remainder subjected to final oxypropylation as described in Example 13a, following.

Example 13a 56.5 pounds of reaction mass identified as Example 12a, preceding, and equivalent to 1.52 pounds of tripentaerythritol, 51.37 pounds of propylene oxide, .15 pound of caustic soda, and 3.46 pounds of xylene, were reacted with 12.25 pounds of propylene oxide in a 5½ hour period. The addition of the oxide was at the rate of about 3 pounds per hour.

What has been said preceding is presented in tabular form in Table 1, following, with some added information as to molecular weight and as to solubility of the reaction product in water, xylene, and kerosene.

and requires no further elaboration. In fact, it is illustrated by some of the examples appearing in the patent previously mentioned.

TABLE 1

| Ex. No. | Composition Before | | | | Composition at End | | | | | | Max. Temp., °F. | Max. Pres., lbs. sq. in. | Time, hrs. |
|---|---|---|---|---|---|---|---|---|---|---|---|---|---|
| | H. C. Amt., lbs. | Oxide Amt., lbs. | Cata- lyst Amt., lbs. | Solvent Amt., lbs. | Theo. M. W. | H. C. Amt., lbs. | Oxide Amt., lbs. | Cata- lyst, lbs. | Solvent, lbs. | Hyd. Mol. Wt. | | | |
| 1a | 7.75 | | .75 | 8.50 | 1675 | 7.75 | 43.50 | .75 | 8.50 | 1362 | 220–230 | 35–37 | 5 |
| 2a | 6.75 | 37.85 | .65 | 7.38 | 2480 | 6.75 | 59.35 | .65 | 7.38 | 1908 | 220–230 | 35–37 | 4 |
| 3a | 4.62 | 40.51 | .45 | 5.05 | 3564 | 4.62 | 61.76 | .45 | 5.05 | 2658 | 240–250 | 20–25 | 4 |
| 4a | 3.32 | 44.35 | .33 | 3.63 | 5040 | 3.32 | 62.60 | .33 | 3.63 | 3492 | 240–250 | 20–25 | 5 |
| 5a | 2.48 | 46.70 | .24 | 2.71 | 7190 | 2.48 | 67.70 | .24 | 2.71 | 4836 | 240–250 | 20–25 | 7 |
| 6a | 1.82 | 49.77 | .18 | 1.99 | 8940 | 1.82 | 62.27 | .18 | 1.99 | 4560 | 240–250 | 20–25 | 7 |
| 7a | 7.5 | | .75 | 17.0 | 1350 | 7.5 | 19.75 | .75 | 17.0 | | 300–320 | 35–37 | 2¼ |
| 8a | 6.32 | 16.63 | .63 | 14.3 | 2760 | 6.32 | 38.88 | .63 | 14.3 | 1952 | 250–270 | 15–20 | 3 |
| 9a | 5.06 | 31.13 | .50 | 11.42 | 5870 | 5.06 | 74.90 | .50 | 11.42 | 3592 | 250–270 | 15–20 | 6 |
| 10a | 2.70 | 39.93 | .27 | 6.10 | 8010 | 2.70 | 55.43 | .27 | 6.10 | 4646 | 250–270 | 15–20 | 3 |
| 11a | 2.36 | 48.56 | .23 | 5.36 | 9680 | 2.36 | 59.06 | .23 | 5.35 | 5240 | 250–270 | 15–20 | 3 |
| 12a | 2.08 | 52.00 | .20 | 4.72 | 12870 | 2.08 | 70.00 | .20 | 4.72 | 6128 | 250–270 | 15–20 | 4 |
| 13a | 1.52 | 51.37 | .15 | 3.46 | 15930 | 1.52 | 63.62 | .15 | 3.46 | 6200 | 250–270 | 15–20 | 5½ |

In Examples 1a through 6a the hydroxy compound was dipentaerythritol. In Examples 7a through 13a the hydroxy compound was tripentaerythritol.

Example 1a was emulsifiable in water, soluble in xylene and insoluble in kerosene; Examples 2a, 3a and 4a were all insoluble in water, soluble in xylene, and insoluble in kerosene; and Examples 5a and 6a were insoluble in water, soluble in xylene, and also soluble in kerosene.

Examples 7a and 8a were insoluble in water, xylene, or kerosene; Examples 9a, 10a, and 11a were all insoluble in water, soluble in xylene, but insoluble in kerosene; and Examples 12a and 13a were insoluble in water, but soluble or emulsifiable in both xylene and kerosene.

The final products varied from a light straw color thru pale amber, to somewhat viscous fluids of a rather dark amber color in one or two instances. This was more or less the characteristic of all the oxypropylated products at the various stages. These products were, of course, slightly alkaline due to the residual caustic soda. The residual basicity, due to the catalyst, of course, would be the same as if sodium methylate had been used.

Speaking of insolubility in water or solubility in kerosene such solubility test can be made simply by shaking small amounts of the materials in a test tube with water, for instance, using 1% to 5% approximately based on the amount of water present.

Needless to say, there is no complete conversion of propylene oxide into the desired hydroxylated compounds. This is indicated by the fact that the theoretical molecular weight based on a statistical average is greater than the molecular weight calculated by usual methods on basis of acetyl or hydroxyl value. Actually, there is no completely satisfactory method for determining molecular weights of these types of compounds with a high degree of accuracy when the molecular weights exceed 2,000. In some instances the acetyl value or hydroxyl value serves as satisfactorily as an index to the molecular weight as any other procedure, subject to the above limitations, and especially in the higher molecular weight range. If any difficulty is encountered in the manufacture of the esters as described in Part 3 the stoichiometrical amount of acid or acid compound should be taken which corresponds to the indicated acetyl or hydroxyl value. This matter has been discussed in the literature and is a matter of common knowledge

PART 3

As previously pointed out the present invention is concerned with acidic esters obtained from the oxypropylated derivatives described in Part 2, immediately preceding, and polycarboxy acids, particularly tricarboxy acids like citric and dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Groote & Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as paratoluene sulfonic acid as a catalyst. There is some objection to this because in some instances there is some evidence that this acid catalyst tends to decompose or rearrange heat-oxypropylated compounds, and particularly likely to do so if the esterification temperature is too high. In the case of polycarboxy acids such as diglycollic acid, which is strongly acidic there is no need to add any catalyst. The use of hydrochloric acid gas has one advantage over paratoluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever.

The products obtained in Part 2 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 2 is then diluted further with sufficient xylene, decalin, petroleum solvent, or the like, so that one has obtained approximately a 40% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures were conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the hydrated sodium sulfate and probably the sodium chloride formed. The clear somewhat viscous straw-colored or amber liquid so obtained may contain a small amount of sodium sulfate or sodium chloride but, in any event, is perfectly acceptable for esterification in the manner described.

It is to be pointed out that the products here described are not polyesters in the sense that there is a plurality of both polypentaerythritol radicals and acid radicals; the product is characterized by having only one polypentaerythritol radical.

By following slight modifications of what has been said previously one can conduct the esterification on a laboratory scale with greater convenience. Obviously, if one starts with a polyhydric compound having 3 or more hydroxyls and adds a dicarboxy acid there is at least some opportunity for cross-linking and formation of insoluble materials. However, insolubility or a gelation effect can arise in other ways, for instance, possible incipient cross-linking rather than intermediate or complete cross-linking, and also the fact that there are certain limitations as far as solubility goes in any large molecule, to say nothing of peculiarities of structure insofar that one of the original reactants, for instance, dipentaerythritol or tripentaerythritol, are much less soluble in water than one might ordinarily expect on the carbon-oxygen ratio. After the water is removed in the case of the esterification by means of a water-insoluble solvent, such as benzene, xylene or the use of some other comparable solvent or mixtures, one is confronted with the fact that the acidic ester is not necessarily soluble in such nonpolar solvent, and possibly because it either does cross-link or at least gives a pseudo gel. I have used the terminology "pseudo gel" for the reason that such gel is reversible as distinguished from a true non-reversible gel produced by cross-linking. The exact nature of this tendency to become insoluble or tendency toward gelation is obscure and not fully understood. In light of the effect of semi-polar solvents there may be some relationship, and in fact an important one to hydrogen bonding factors.

However, by the addition of a semi-polar solvent, such as diethyl Carbitol, which is the trade name for diethyleneglycol diethylether, or some other similar solvent such as an alcohol, one tends to reduce or eliminate this effect. The alcohol, of course, must be added at the end of the reaction so as to not interfere with the esterification. The non-hydroxy semi-polar solvent can be obtained at the start of esterification provided it does not interfere with water removal. In any event, one can obtain a homogeneous system in which substantially the entire material is solid.

Referring to the original oxypropylation it is to be noted that a solvent, such as xylene, is present for a matter of convenience such as giving an incipient slurry. Also, it is to be noted that the intermediates are xylene-soluble especially in the latter stages. Therefore, even if one were to use benzene alone or cymene alone, there still would be present the xylene which had been used in the oxypropylation step.

Referring now to a number of examples, for instance, Examples 1b through 36b, the solvent is indicated as "benzene, xylene, diethyl Carbitol." Diethyl Carbitol is, as previously pointed out, the diethyl ether of diethylene glycol. The xylene indicated is not added xylene but refers to the xylene used in the oxypropylation step. In each instance the amount of benzene added was 50 grams. Then sufficient diethyl Carbitol was added to give the indicated weight. Actually, the amount of this latter solvent added was judged purely as a matter of convenience in the glassware employed, and when the reaction was complete the reaction mass was weighed, and this weight used to calculate the actual total solvent. In each instance an effort was made to obtain approximately a 50% solution. For instance, in Example 1b the amount of hydroxylated material, 109 grams, was on a solvent-free basis. The amount of total solvents added, 200.7 grams, included the xylene which originally accompanied the hydroxylated material. In every instance an effort was made to obtain a homogeneous solution even if there happened to be present more than 50% of solvent. The selection of 50% solvent was just arbitrary for the reason that when these compounds were tested for demulsification it was convenient to have a 50% solution. It goes without saying that a 25% solution would serve also. In practically every instance after a homogeneous solution was obtained one could subject it to distillation, particularly vacuum distillation, remove a small amount of benzene and still have a homogeneous solution having exactly 50% if desired. In this modification one could, of course, use decalin, cymene, or some other ether such as the diethyl ether of ethyleneglycol, or a comparable ether instead of the particular one used.

What has been said previously applies also to some of the other derivatives although some other variants can be employed for instance, in Examples 40b and 41b there was a tendency for solids to separate out. In these experiments there was some solid material at the end of the procedure which apparently was soluble in methanol. Therefore, a small amount of methanol, approximately 10 to 30 grams, were added which resulted in more complete solubility. The same is true in Examples 49b, 53b, and 59b. For reasons above indicated the percentage solvent is noted because frequently it is not exactly 50%. Also these variations are of incidental value, as a convenience, but are not an inherent part of the invention. This is obvious from the hereto attached claims.

The data included in the subsequent tables, i. e., Tables 2 and 3, are self-explanatory, and very complete, and it is believed no further elaboration is necessary.

TABLE 2

| Ex. No. of Acid Ester | Ex. No. of Oxy. Cmpd. | Theo. M. W. of H. C. | Theo. Hydroxyl V. of H. C. | Actual Hydroxyl Value | Mol. Wt. Based on Actual H. V. | Amt. of Hyd. Cmpd. (grs.) | Polycarboxy Reactant | Amt. of Polycarboxy Reactant (grs.) |
|---|---|---|---|---|---|---|---|---|
| 1b | 1a | 1,675 | 201 | 248 | 1,362 | 108.9 | Diglycolic Acid | 64.3 |
| 2b | 1a | 1,675 | 201 | 248 | 1,362 | 108.9 | Oxalic Acid | 60.5 |
| 3b | 1a | 1,675 | 201 | 248 | 1,362 | 108.9 | Aconitic Acid | 83.5 |
| 4b | 1a | 1,675 | 201 | 248 | 1,362 | 108.9 | Phthalic Anhyd | 71.0 |
| 5b | 1a | 1,675 | 201 | 248 | 1,362 | 108.9 | Maleic Anhyd | 47.0 |
| 6b | 1a | 1,675 | 201 | 248 | 1,362 | 108.9 | Adipic Acid | 70.0 |
| 7b | 2a | 2,480 | 136 | 176.5 | 1,908 | 95.4 | Diglycolic Acid | 40.2 |
| 8b | 2a | 2,480 | 136 | 176.5 | 1,908 | 95.4 | Oxalic Acid | 37.8 |
| 9b | 2a | 2,480 | 136 | 176.5 | 1,908 | 95.4 | Aconitic Acid | 52.2 |
| 10b | 2a | 2,480 | 136 | 176.5 | 1,908 | 95.4 | Phthalic Anhyd | 44.4 |
| 11b | 2a | 2,480 | 136 | 176.5 | 1,908 | 95.4 | Maleic Anhyd | 29.4 |
| 12b | 2a | 2,480 | 136 | 176.5 | 1,908 | 95.4 | Adipic Acid | 43.8 |
| 13b | 3a | 3,564 | 94.5 | 127 | 2,658 | 106.3 | Diglycolic Acid | 32.2 |
| 14b | 3a | 3,564 | 94.5 | 127 | 2,658 | 106.3 | Oxalic Acid | 30.3 |
| 15b | 3a | 3,564 | 94.5 | 127 | 2,658 | 106.3 | Aconitic Acid | 41.8 |
| 16b | 3a | 3,564 | 94.5 | 127 | 2,658 | 106.3 | Adipic Acid | 35.0 |
| 17b | 3a | 3,564 | 94.5 | 127 | 2,658 | 106.3 | Phthalic Anhyd | 35.5 |
| 18b | 3a | 3,564 | 94.5 | 127 | 2,658 | 106.3 | Maleic Anhyd | 23.5 |
| 19b | 4a | 5,040 | 67.0 | 96.5 | 3,492 | 104.8 | Diglycolic Acid | 24.0 |
| 20b | 4a | 5,040 | 67.0 | 96.5 | 3,492 | 52.4 | Oxalic Acid | 11.3 |
| 21b | 4a | 5,040 | 67.0 | 96.5 | 3,492 | 139.4 | Aconitic Acid | 41.8 |
| 22b | 4a | 5,040 | 67.0 | 96.5 | 3,492 | 139.7 | Adipic Acid | 35.0 |
| 23b | 4a | 5,040 | 67.0 | 96.5 | 3,492 | 139.7 | Phthalic Anhyd | 35.5 |
| 24b | 4a | 5,040 | 67.0 | 96.5 | 3,492 | 104.8 | Maleic Anhyd | 17.6 |
| 25b | 5a | 7,190 | 47.0 | 69.7 | 4,836 | 96.7 | Diglycolic Acid | 16.1 |
| 26b | 5a | 7,190 | 47.0 | 69.7 | 4,836 | 96.7 | Oxalic Acid | 18.1 |
| 27b | 5a | 7,190 | 47.0 | 69.7 | 4,836 | 96.7 | Aconitic Acid | 20.9 |
| 28b | 5a | 7,190 | 47.0 | 69.7 | 4,836 | 96.7 | Adipic Acid | 17.5 |
| 29b | 5a | 7,190 | 47.0 | 69.7 | 4,836 | 96.7 | Phthalic Anhyd | 17.8 |
| 30b | 5a | 7,190 | 47.0 | 69.7 | 4,836 | 96.7 | Maleic Anhyd | 11.8 |
| 31b | 6a | 8,940 | 37.7 | 73.7 | 4,560 | 91.2 | Diglycolic Acid | 16.1 |
| 32b | 6a | 8,940 | 37.7 | 73.7 | 4,560 | 91.2 | Oxalic Acid | 18.1 |
| 33b | 6a | 8,940 | 37.7 | 73.7 | 4,560 | 91.2 | Aconitic Acid | 20.9 |
| 34b | 6a | 8,940 | 37.7 | 73.7 | 4,560 | 91.2 | Adipic Acid | 17.5 |
| 35b | 6a | 8,940 | 37.7 | 73.7 | 4,560 | 91.2 | Phthalic Anhyd | 17.8 |
| 36b | 6a | 8,940 | 37.7 | 73.7 | 4,560 | 91.2 | Maleic Anhyd | 11.8 |
| 37b | 8a | 2,760 | 163.5 | 230 | 1,952 | 97.6 | Diglycolic Acid | 53.6 |
| 38b | 8a | 2,760 | 163.5 | 230 | 1,952 | 97.6 | Oxalic Acid | 50.4 |
| 39b | 8a | 2,760 | 163.5 | 230 | 1,952 | 97.6 | Aconitic Acid | 69.6 |
| 40b | 8a | 2,760 | 163.5 | 230 | 1,952 | 97.6 | Adipic Acid | 58.4 |
| 41b | 8a | 2,760 | 163.5 | 230 | 1,952 | 97.6 | Phthalic Anhyd | 59.2 |
| 42b | 8a | 2,760 | 163.5 | 230 | 1,952 | 97.6 | Maleic Anhyd | 39.2 |
| 43b | 9a | 5,870 | 76.5 | 125.0 | 3,592 | 107.8 | Diglycolic Acid | 32.2 |
| 44b | 9a | 5,870 | 76.5 | 125.0 | 3,592 | 107.8 | Oxalic Acid | 30.6 |
| 45b | 9a | 5,870 | 76.5 | 125.0 | 3,592 | 107.8 | Aconitic Acid | 41.8 |
| 46b | 9a | 5,870 | 76.5 | 125.0 | 3,592 | 107.8 | Adipic Acid | 35.0 |
| 47b | 9a | 5,870 | 76.5 | 125.0 | 3,592 | 107.8 | Phthalic Anhyd | 35.5 |
| 48b | 9a | 5,870 | 76.5 | 125.0 | 3,592 | 107.8 | Maleic Anhyd | 23.5 |
| 49b | 10a | 8,010 | 56.0 | 96.9 | 4,640 | 92.8 | Diglycolic Acid | 21.5 |
| 50b | 10a | 8,010 | 56.0 | 96.9 | 4,640 | 92.8 | Oxalic Acid | 20.2 |
| 51b | 10a | 8,010 | 56.0 | 96.9 | 4,640 | 92.8 | Aconitic Acid | 27.8 |
| 52b | 10a | 8,010 | 56.0 | 96.9 | 4,640 | 92.8 | Adipic Acid | 23.4 |
| 53b | 10a | 8,010 | 56.0 | 96.9 | 4,640 | 92.8 | Phthalic Anhyd | 23.7 |
| 54b | 10a | 8,010 | 56.0 | 96.9 | 4,640 | 92.8 | Maleic Anhyd | 17.5 |
| 55b | 11a | 9,680 | 46.4 | 86.0 | 5,240 | 104.8 | Diglycolic Acid | 21.5 |
| 56b | 11a | 9,680 | 46.4 | 86.0 | 5,240 | 104.8 | Oxalic Acid | 20.2 |
| 57b | 11a | 9,680 | 46.4 | 86.0 | 5,240 | 104.8 | Aconitic Acid | 27.8 |
| 58b | 11a | 9,680 | 46.4 | 86.0 | 5,240 | 104.8 | Adipic Acid | 23.4 |
| 59b | 11a | 9,680 | 46.4 | 86.0 | 5,240 | 104.8 | Phthalic Anhyd | 23.7 |
| 60b | 11a | 9,680 | 46.4 | 86.0 | 5,240 | 104.8 | Maleic Anhyd | 15.7 |
| 61b | 12a | 12,870 | 34.9 | 73.4 | 6,128 | 122.6 | Diglycolic Acid | 21.5 |
| 62b | 12a | 12,870 | 34.9 | 73.4 | 6,128 | 122.6 | Oxalic Acid | 20.2 |
| 63b | 12a | 12,870 | 34.9 | 73.4 | 6,128 | 122.6 | Aconitic Acid | 27.8 |
| 64b | 12a | 12,870 | 34.0 | 73.4 | 6,128 | 122.6 | Adipic Acid | 23.4 |
| 65b | 12a | 12,870 | 34.9 | 73.4 | 6,128 | 122.6 | Phthalic Anhyd | 23.7 |
| 66b | 12a | 12,870 | 34.9 | 73.4 | 6,128 | 122.6 | Maleic Anhyd | 15.7 |
| 67b | 13a | 15,930 | 28.1 | 72.4 | 6,200 | 124 | Diglycolic Acid | 21.5 |
| 68b | 13a | 15,930 | 28.1 | 72.4 | 6,200 | 124 | Oxalic Acid | 20.2 |
| 69b | 13a | 15,930 | 28.1 | 72.4 | 6,200 | 124 | Aconitic Acid | 27.8 |
| 70b | 13a | 15,930 | 28.1 | 72.4 | 6,200 | 124 | Adipic Acid | 23.4 |
| 71b | 13a | 15,930 | 28.1 | 72.4 | 6,200 | 124 | Phthalic Anhyd | 23.7 |
| 72b | 13a | 15,930 | 28.1 | 72.4 | 6,200 | 124 | Maleic Anhyd | 15.7 |

TABLE 3

| Ex. No. of Acid Ester | Solvent | Amt. Solvent (grs.) | Max. Esterification Temp., °C. | Time of Esterification (hrs.) | Water Out (cc.) | Percent Solvent |
|---|---|---|---|---|---|---|
| 1b | Benzene, Xylene, Diethylcarbitol | 200.7 | 165 | 1½ | 8.7 | 55 |
| 2b | do | 179.6 | 160 | 2 | 26.0 | 55 |
| 3b | do | 219.9 | 165 | 2 | 8.7 | 54 |
| 4b | do | 215.3 | 150 | 2 | 0.8 | 55 |
| 5b | do | 191.1 | 165 | 1¼ | 1.0 | 55 |
| 6b | do | 206.4 | 165 | 2¼ | 8.7 | 55 |
| 7b | do | 130.2 | 165 | 1¼ | 5.4 | 50 |
| 8b | do | 117.0 | 147 | 1¾ | 16.2 | 50 |
| 9b | do | 142.2 | 163 | 2½ | 5.4 | 50 |
| 10b | do | 139.8 | 160 | 3 | Trace | 50 |
| 11b | do | 124.8 | 150 | 3 | Trace | 50 |
| 12b | do | 134.4 | 180 | 8¾ | 4.8 | 50 |
| 13b | do | 134.2 | 170 | 2 | 4.3 | 50 |
| 14b | do | 123.6 | 150 | 2 | 13.0 | 50 |
| 15b | do | 143.8 | 155 | 2 | 4.3 | 50 |
| 16b | do | 137.0 | 185 | 14½ | 4.3 | 50 |
| 17b | do | 141.8 | 190 | 11¼ | Trace | 50 |
| 18b | do | 129.8 | 160 | 3¼ | Trace | 50 |
| 19b | do | 131.2 | 165 | 1 | 2.6 | 51 |
| 20b | do | 61.3 | 145 | 1 | 5.0 | 52 |
| 21b | do | 178.3 | 145 | 1¾ | 5.5 | 51 |
| 22b | do | 175.0 | 140 | 3½ | 3.6 | 50 |
| 23b | do | 178.5 | 145 | 3 | Trace | 51 |
| 24b | do | 126.4 | 165 | 1 | Trace | 52 |
| 25b | do | 112.9 | 180 | ¾ | 2.6 | 50 |
| 26b | do | 107.6 | 155 | ¾ | 6.8 | 51 |
| 27b | do | 118.1 | 180 | ¾ | 2.2 | 52 |
| 28b | do | 114.7 | 170 | ¾ | 2.6 | 51 |
| 29b | do | 117.3 | 180 | 2¼ | Trace | 51 |
| 30b | do | 110.0 | 165 | ¾ | Trace | 51 |
| 31b | do | 107.9 | 195 | ¾ | 2.8 | 51 |
| 32b | do | 102.5 | 168 | ¼ | 7.0 | 51 |
| 33b | do | 112.3 | 175 | ¼ | 3.2 | 51 |
| 34b | do | 109.9 | 175 | ¼ | 2.2 | 51 |
| 35b | do | 112.0 | 183 | ¾ | 0.6 | 51 |
| 36b | do | 105.7 | 176 | ½ | 0.5 | 59 |
| 37b | do | 202.8 | 165 | 1 | 7.2 | 59 |
| 38b | do | 185.2 | 155 | 1 | 21.6 | 58 |
| 39b | do | 218.8 | 160 | 1¼ | 7.2 | 58 |
| 40b | do | 207.6 | 165 | 2¼ | 7.2 | 58 |
| 41b | do | 214.0 | 170 | 1 | 1.0 | 59 |
| 42b | do | 193.8 | 160 | 1 | 1.0 | 55 |
| 43b | do | 165.8 | 145 | ¾ | 4.6 | 55 |
| 44b | do | 150.6 | 160 | 1½ | 13.0 | 54 |
| 45b | do | 169.8 | 170 | ½ | 4.6 | 54 |
| 46b | do | 162.8 | 145 | ½ | 4.4 | 54 |
| 47b | do | 167.3 | 175 | 1¼ | 0.6 | 54 |
| 48b | do | 155.9 | 168 | 1 | 1.0 | 53 |
| 49b | do | 126.0 | 150 | 1 | 3.0 | 53 |
| 50b | do | 119.0 | 160 | 1 | 8.8 | 53 |
| 51b | do | 133.6 | 165 | 1 | 3.0 | 53 |
| 52b | do | 129.2 | 160 | 1 | 3.0 | 53 |
| 53b | Benzene, Xylene, Diethylcarbitol, Methanol. | 131.9 | 155 | 1¼ | 1.0 | 53 |
| 54b | Benzene, Xylene, Diethylcarbitol. | 122.7 | 150 | 1¼ | 1.0 | 53 |
| 55b | do | 123.3 | 145 | ¾ | 3.0 | 50 |
| 56b | do | 116.4 | 135 | 1 | 8.6 | 50 |
| 57b | do | 129.6 | 140 | ¾ | 3.0 | 50 |
| 58b | do | 125.2 | 147 | 1 | 3.0 | 50 |
| 59b | Benzene, Xylene, Diethylcarbitol, Methanol. | 127.7 | 153 | ¾ | 0.8 | 50 |
| 60b | Benzene, Xylene, Diethylcarbitol. | 119.7 | 143 | ¾ | 0.8 | 50 |
| 61b | do | 141.1 | 147 | ¾ | 3.0 | 50 |
| 62b | do | 133.8 | 132 | ¾ | 9.0 | 50 |
| 63b | do | 146.4 | 142 | ¾ | 4.0 | 50 |
| 64b | do | 143.0 | 155 | ¾ | 3.0 | 50 |
| 65b | do | 146.0 | 150 | ¾ | 0.3 | 50 |
| 66b | do | 138.0 | 140 | ¾ | 0.3 | 50 |
| 67b | do | 142.3 | 155 | ¾ | 3.2 | 50 |
| 68b | do | 135.6 | 152 | 1 | 8.6 | 50 |
| 69b | do | 148.0 | 162 | ¾ | 3.8 | 50 |
| 70b | do | 144.4 | 160 | 1 | 3.0 | 50 |
| 71b | do | 147.7 | 180 | 1¼ | | 50 |
| 72b | do | 138.7 | 165 | 1¼ | 1.0 | 50 |

The procedure for manufacturing the esters has been illustrated by preceding examples. If for any reason reaction does not take place in a manner that is acceptable, attention should be directed to the following details: (a) Recheck the hydroxyl or acetyl value of the oxypropylated hydroxy compounds of the kind specified and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal, as the size of the molecule increases and the reactive hydroxyl radical represents a smaller fraction of the entire molecule more difficulty is involved in obtaining complete esterification.

Even under the most carefully controlled conditions of oxypropylation involving comparatively low temperatures and long time of reaction there are formed certain compounds whose compositions is still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the oxypropylated derivative results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value and conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and particularly vacuum distillation. The final products or liquids are generally straw or pale amber through dark amber in color, and some have a distinct yellowish cast and show moderate viscosity, or sometimes increased viscosity in light of what has been said previously in regard to cross-linking, gelation, etc. Unless there is some reason to do otherwise my preference is to handle these esters as 50% solutions in suitable solvents. They can be bleached with bleaching clays, filtering chars, and the like. However, for the purpose of demulsification or the like color is not a factor and decolorization is not justified.

PART 4

As pointed out previously the final product obtained is a fractional ester having free carboxyl radicals. Such product can be used as an intermediate for conversion into other derivatives which are effective for various purposes, such as the breaking of petroleum emulsions of the kind herein described. For instance, such product can be neutralized with an amine so as to increase its water solubility, such as triethanolamine, tripropanolamine, oxyethylated triethanolamine, etc. Similarly, such product can be neutralized with some amine which tends to reduce the water-solubility such as cyclohexylamine, benzylamine, decylamine, tetradecylamine, octadecylamine, etc. Furthermore, the residual carboxyl radicals can be esterified with alcohols, such as low molal alcohols, methyl, ethyl, propyl, butyl, etc., and also high molal alcohols, such as octyl, decyl, cyclohexanol, benzyl alcohol, octadecyl alcohol, etc. Such products are also valuable for a variety of purposes due to their modified solubility. This is particularly true where surface-active materials are of value and especially in demulsification of water-in-oil emulsions.

Having thus described my invention what I claim as new and desire to secure by Letters Patent, is

1. An ester of a polycarboxy acid and an oxypropylated polypentaerythritol in which the ratio of polycarboxy acid to oxypropylated polypentaerythritol is one mole of the acid for each available hydroxyl radical of the oxypropylated polypentaerythritol and in which the oxypropylated polypentaerythritol has a molecular weight between 5,000 and 65,000 and the polypentaerythritol represents not more than 7% by weight of the oxypropylated polypentaerythritol on a statistical basis and the assumption of complete reaction involving the propylene oxide and the polypentaerythritol and in which the polycarboxy acid is selected from the group consisting of acyclic and isocyclic polycarboxy acids having not more than 3 carboxy groups nor more than 8 carbon atoms and composed of carbon, hydrogen and oxygen.

2. A product as in claim 1 wherein the polypentaerythritol has at least 2 and not more than 3 erythritol radicals.

3. The product of claim 2 wherein the polycarboxy acid is a dicarboxy acid.

4. The product of claim 3 wherein the dicarboxy acid is phthalic acid.

5. The product of claim 3 wherein the dicarboxy acid is maleic acid.

6. The product of claim 3 wherein the dicarboxy acid is succinic acid.

7. The product of claim 3 wherein the dicarboxy acid is citraconic acid.

8. The product of claim 3 wherein the dicarboxy acid is diglycollic acid.

No references cited.